United States Patent
Liddicott

(10) Patent No.: US 9,813,526 B2
(45) Date of Patent: Nov. 7, 2017

(54) REDUCING TRANSMISSION PATHWAY LENGTHS WITHIN A DISTRIBUTED NETWORK

(71) Applicant: Dell Software Inc., Round Rock, TX (US)

(72) Inventor: Samuel Liddicott, Wakerfield (GB)

(73) Assignee: SONICWALL INC., Santa Clara, CA (US)

( * ) Notice: Subject to any disclaimer, the term of this patent is extended or adjusted under 35 U.S.C. 154(b) by 341 days.

(21) Appl. No.: 14/722,055

(22) Filed: May 26, 2015

(65) Prior Publication Data

US 2016/0352869 A1    Dec. 1, 2016

(51) Int. Cl.
G06F 15/16 (2006.01)
H04L 29/06 (2006.01)
H04L 12/707 (2013.01)
H04L 29/08 (2006.01)

(52) U.S. Cl.
CPC ............ *H04L 69/162* (2013.01); *H04L 45/22* (2013.01); *H04L 67/02* (2013.01); *H04L 67/327* (2013.01)

(58) Field of Classification Search
CPC ....... H04L 45/22; H04L 67/02; H04L 67/327; H04L 69/162
USPC ........................................................ 709/227
See application file for complete search history.

(56) References Cited

U.S. PATENT DOCUMENTS

| | | | |
|---|---|---|---|
| 6,826,152 B1 | 11/2004 | Kroon | |
| 7,120,666 B2 | 10/2006 | McCanne et al. | |
| 7,254,636 B1 | 8/2007 | O'Toole, Jr. et al. | |
| 7,716,307 B1 | 5/2010 | Ben-Shaul et al. | |
| 8,090,866 B1 | 1/2012 | Bashyam et al. | |
| 8,112,505 B1 | 2/2012 | Ben-Shaul et al. | |
| 8,176,186 B2 | 5/2012 | McCanne et al. | |
| 8,244,864 B1* | 8/2012 | Bahl | H04L 67/148 709/225 |
| 2003/0065796 A1 | 4/2003 | Borr | |
| 2003/0084183 A1 | 5/2003 | Odlund et al. | |
| 2003/0204593 A1* | 10/2003 | Brown | H04L 41/0816 709/225 |
| 2005/0015461 A1 | 1/2005 | Richard | |
| 2005/0086306 A1 | 4/2005 | Lemke | |
| 2005/0114436 A1 | 5/2005 | Betarbet | |
| 2005/0262220 A1 | 11/2005 | Ecklund | |
| 2007/0124477 A1* | 5/2007 | Martin | H04L 63/0428 709/226 |
| 2009/0077252 A1 | 3/2009 | Abdo | |
| 2009/0222515 A1 | 9/2009 | Thompson et al. | |

(Continued)

OTHER PUBLICATIONS

U.S. Appl. No. 14/821,635 Office Action dated Apr. 24, 2017.

(Continued)

*Primary Examiner* — Bryan Lee

(74) *Attorney, Agent, or Firm* — Polsinelli LLP

(57) ABSTRACT

A solution for reducing transmission pathway lengths within a distributed network, as embodied in various systems, methods, and non-transitory computer-readable storage media, may include migrating a TCP socket from a request server to a data server. The solution may further include reprogramming one or more routers to recognize a new packet route based on the migrated socket. The solution may include the one or more routers subsequently communicating directly with the data server while bypassing the request server.

20 Claims, 3 Drawing Sheets

(56) References Cited

U.S. PATENT DOCUMENTS

| | | | |
|---|---|---|---|
| 2009/0276543 A1 | 11/2009 | Turner et al. | |
| 2009/0300162 A1* | 12/2009 | Demarie | H04L 67/26 709/224 |
| 2010/0098092 A1 | 4/2010 | Luo et al. | |
| 2011/0051173 A1 | 3/2011 | Yagishita | |
| 2012/0226738 A1 | 9/2012 | Taneja et al. | |
| 2012/0257500 A1 | 10/2012 | Lynch | |
| 2012/0265892 A1 | 10/2012 | Ma | |
| 2013/0091303 A1 | 4/2013 | Mitra et al. | |
| 2013/0297679 A1 | 11/2013 | Kim | |
| 2014/0026182 A1 | 1/2014 | Pearl | |
| 2014/0040353 A1 | 2/2014 | Sebastian | |
| 2015/0089019 A1 | 3/2015 | Chou | |
| 2016/0085920 A1 | 3/2016 | Cyran | |
| 2016/0156696 A1 | 6/2016 | Liddicott | |
| 2016/0198020 A1 | 7/2016 | Zhao | |
| 2016/0335324 A1* | 11/2016 | Caulfield | G06F 17/30241 |
| 2017/0041431 A1 | 2/2017 | Liddicott | |

OTHER PUBLICATIONS

U.S. Appl. No. 14/591,781 Office Action dated Nov. 18, 2016.
U.S. Appl. No. 14/556,157 Office Action dated Nov. 15, 2016.
U.S. Appl. No. 14/591,781, filed Jan. 7, 2015, Li Zhao, Optimizing Transfer of Fragmented Packetized Data.
U.S. Appl. No. 14/821,635, filed Aug. 7, 2015, Samuel Liddicott, Read-Ahead on Signed Connections With Unsigning, Inline, Transparent Proxies.
U.S. Appl. No. 14/591,781 Final Office Action dated May 26, 2017.
U.S. Appl. No. 14/556,157 Office Action dated Jun. 5, 2017.

* cited by examiner

REDUCING TRANSMISSION PATHWAY LENGTHS WITHIN A DISTRIBUTED NETWORK

BACKGROUND OF THE INVENTION

Technical Field

The present disclosure concerns network load. More particularly, the present disclosure relates to a socket migration-based solution for reducing transmission pathway lengths within a distributed network.

Description of the Related Art

In large distributed data stores with on-demand retrieval (e.g., Google® cache, Facebook® servers, Gmail® servers, Instagram® servers, and the like), a given data server may not be topologically near the network server handling client requests (e.g., a request for an image stored at a distant network database). As a result, the data server must transfer data responses across the internal network to the request server that handled the client request. The request server must then transfer the response to a router (or, in many cases, a series of routers). Finally, the router must transfer the response to the client. These existing data transfer approaches result in burdened transmission pathways that are longer than they need be and ultimately place additional load on the network.

Although existing processes involve socket migration to a degree (e.g., migratory TCP, MSOCKS, MIGSOCK, TCP migration), none of them address the foregoing problem. For instance, some of the existing solutions are used in the context of server failover (e.g., where one server fails, another server will pick up the socket), but they do not reduce the amount of network traversed by the data. In other cases, socket information is transferred to migrate a process while the process is running (e.g., MOSIX or NOMADS), but those technologies, too, fail to reduce the amount of network traversed by the data. Moreover, existing migration processes are limited to migrating sockets between the same process running on different machines (e.g., in the case of server failover migration) or migrating a socket with a process (e.g., in the case of MOSES). These processes fail to reduce transmission pathway lengths, result in unnecessary load on the network, and as a result are limited in their utility. Moreover, the foregoing solutions are limited insofar as they are typically used to migrate sockets between machines that are nearby. As a result, they are not suitable for socket migrations across large distributed networks (e.g., across different subnets or across the country).

Other existing processes involve passing socket information as well (e.g., TCP splice, NAT, proxy, or SSL termination devices), but they require copying of data, additional sockets, and new TCP sequence numbers and checksums to effectively transmit a response back to the client. In short, they contribute to high load on the network by requiring secondary connections and multiple relays of data.

Given those shortcomings in the art, there is a need for improved socket migration-based systems and methods that reduce network load.

SUMMARY OF THE CLAIMED INVENTION

A solution for reducing transmission pathway lengths within a distributed network, as embodied in various systems, methods, and non-transitory computer-readable storage medium, is disclosed. In one claimed embodiment, a system for reducing transmission pathway lengths within a distributed network includes a request server, a router, and a data server. The request server includes a processor, a network interface, and a memory storing executable instructions. By way of executing the instructions, the request server establishes a TCP socket. The socket is associated with socket state information. The request server receives a client request from a client device communicatively coupled to the network. The request server then identifies a data server capable of fulfilling the client request. The request server further transmits a migrate socket request and the client request to the router. The router includes a processor, a network interface, and memory storing a routing table. The data server includes a processor, a network interface, and a memory storing executable instructions. By way of executing the instructions, the data server receives the migrate socket request and the client request from the router, establishes a new socket based on the migrate socket request, and sends a data response to the router over the established socket. The data response bypasses the request server.

In another claimed embodiment, a method for reducing transmission pathway lengths within a distributed network includes receiving a client request at a router. The method includes sending the client request to a request server communicatively coupled to the router by the network. The method further includes receiving a migrate socket request from the request server. The client request and an identification of a data server storing a resource requested by the client request are also received. The method includes executing instructions stored in memory of the router that, when executed, send the client request and the migrate socket request to the data server. The method further includes updating one or more routing tables to identify a new route between the client device and the data server based on the socket migration and, after the route is established, transmitting subsequent packets received from the client device to the data server over the new route. The new route bypasses the request server.

In yet a further embodiment, a non-transitory computer-readable storage medium stores an executable computer program. When executed by a processor, the program performs a method for reducing transmission pathway lengths within a distributed network. The method includes receiving a client request at a router. The method includes sending the client request to a request server communicatively coupled to the router by the network. The method further includes receiving a migrate socket request from the request server. The client request and an identification of a data server storing a resource requested by the client request are also received. The method includes sending the client request and the migrate socket request to the data server. The method further includes updating one or more routing tables to identify a new route between the client device and the data server based on the socket migration and, after the route is established, transmitting subsequent packets received from the client device to the data server over the new route. The new route bypasses the request server.

DETAILED DESCRIPTION

A solution for reducing transmission pathway lengths within a distributed network is provided. Although the novel solution is illustrated in this disclosure by way of various systems, methods, and non-transitory computer-readable media, it should be understood that the embodiments described herein are exemplary only and are in no way limiting. For instance, although certain portions of the present disclosure discuss HTTP protocols, the described solution applies equally to HTTPS, non-HTTP protocols (e.g., IMAP), and non-TCP protocols in which a state is maintained and associated with certain packets having common information (e.g., User Datagram Protocol or "UDP" media streams). Moreover, although the figures provided illustrate one embodiment as applied within an illustrative network environment, the solution may be adapted to suit any number of network architectures. Persons of ordinary skill in the art will readily recognize and appreciate that the present disclosure suggests many other possible embodiments in addition to those expressly described herein.

The solution provides improved systems, methods, and non-transitory computer-readable storage media for transferring data within large distributed networks. In various embodiments, the solution may involve establishing new routes within a distributed network that relieve a request server from serving as an intermediary between a client device and a data server. The solution may involve migrating a socket by transmitting socket state information, information about a requested resource, and reprogramming the network by updating routing tables stored in memory of one or more routers. In some embodiments, a socket may be migrated from the resource server to the data server, while in other embodiments the socket may be migrated from the resource server to an edge router. For purposes of this disclosure, the term "edge router" means a router located near the edge of a distributed network (or sub-network) in which the solution is reducing internal network transmission pathway lengths. In some embodiments, the edge router may utilize network address translation (NAT) to translate between two sockets or, with the aid of NAT helpers, bridge two sockets within its NAT table. In any of the foregoing instances, the solution effectively reduces traffic by permitting a router to send data directly to a data server maintaining a request resource rather than having to use the original request server as relay.

Figure 1:
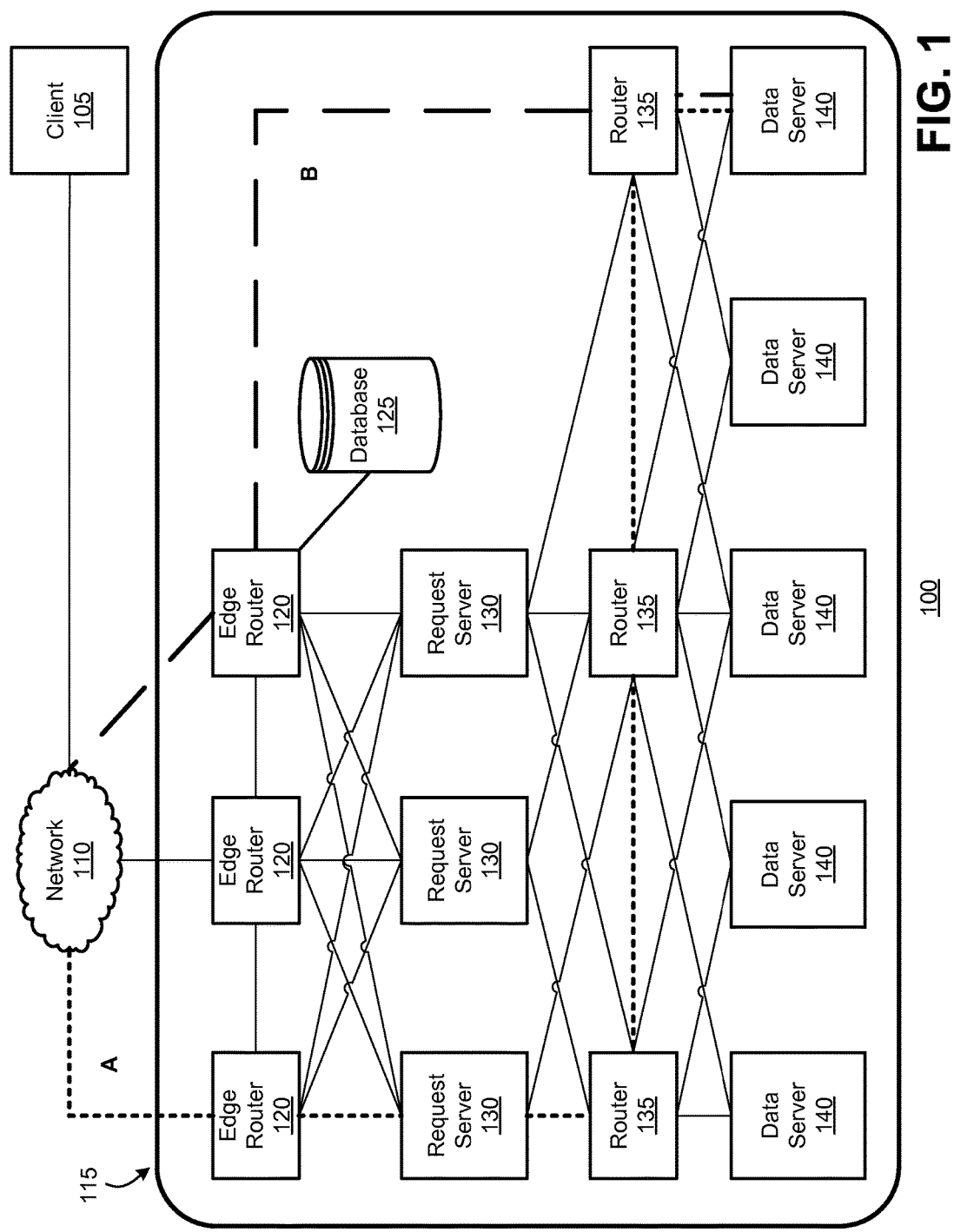
FIG. 1 is a block diagram of an exemplary environment in which a solution for reducing transmission pathway lengths in a distributed network may be implemented.

FIG. 1 is a block diagram of an exemplary environment 100 in which a solution for reducing transmission pathway lengths in a distributed network may be implemented by way of various embodiments (e.g., a system, method, or computer-readable non-transitory storage media). Although FIG. 1 is presented in the context of an internal or private distributed network, persons of ordinary skill in the art will readily recognize and appreciate that the solution described herein may be implemented in a variety of other network contexts. Accordingly, although certain figures have been presented for the purpose of illustration, they should not be construed as limited to the precise forms disclosed. By way of an example, where FIG. 1 illustrates an exemplary network environment that includes a distributed private network. The network includes various network devices, such as clients, routers (e.g., edge routers or internal network routers), and servers (e.g., request servers and data servers, which persons of ordinary skill in the art will appreciate may alternatively be referred to as web servers/hosts and resource servers, respectively). Notwithstanding the network architecture shown, it should be understood that the described embodiment is exemplary and that, in other possible embodiments, the solution may be utilized in connection with numerous other network arrangements.

As shown in FIG. 1, an exemplary environment 100 may include a client device 105 communicatively coupled to a communications network 110. Client device 105 may be any computing device that includes a process, memory, and a network interface, such as a desktop computer, workstation, laptop, smartphone, tablet, or other type of computing device. Client 105 may be communicatively coupled to network 110 by way of the network interface. Client 105 may be coupled either directly to network 110 or through any number of intermediate servers, gateways, or other network devices.

Network 110 may be implemented as a private network, a public network, an intranet, the Internet, or any suitable combination of the foregoing. In the context of exemplary environment 100 shown in FIG. 1 for illustrative purposes, network 110 is the Internet.

Environment 100 may further include a distributed network 115 communicatively coupled to network 110. Distributed network 115 may be a private or internal network and, in some embodiments, may constitute a data center. In some embodiments, distributed network 115 may be large insofar as it may contain a substantial number of network devices and/or may be distributed across a wide geographic area (e.g., across a large country such as the United States). The boundary line shown to illustrate the scope of distributed network 115 is merely exemplary and it should be understood that the boundary line does not convey any limitations on the potential scope of distributed network 115.

Distributed network 115 may include a plurality of network devices communicatively coupled to one another. As shown in FIG. 1, distributed network 115 may include one or more routers 120 (e.g., edge routers). Each router 120 may include a processor, a network interface, and memory storing a database 125 of routing tables. The memory of each router 120 may further store executable instructions that, when executed by a processor of router 120, may match source and destination information (e.g., port and address information) to determine suitable connections through which to transmit packets. The memory of each router 120 may further store executable instructions that, when executed by a processor of router 120, may rewrite or otherwise update source and destination information (e.g., port and address information) to add new routes or delete routes that are no longer viable or optimal routing options.

Distributed network 115 may further include a plurality of servers 130 (e.g., request servers, web servers, or network servers). Distributed network 115 may further include one or more additional routers 135 disposed in the interior of the distributed network. Each router 135 may include the same elements described above with respect to the one or more routers 120. Distributed network may also include a plurality of data servers 140. Each of the foregoing network devices may include a processor, a network interface, and memory storing executable instructions that, when executed by the processor, perform a predetermined function, operation, or process.

In operation, after client 105 establishes a TCP connection, client 105 may submit an HTTP request (e.g., HTTP GET) for a resource (e.g., a prepared resource such as a video file, image file, or the like) to distributed network 115 by way of network 110. For purposes of illustration, FIG. 1 identifies an exemplary data route in a short-dashed line A. Edge router 120 may receive packets comprising the request at the edge of distributed network 115 (i.e., the entry point to network 115) and relay the packets to request server 130. After receiving the request, request server 130 may identify one or more appropriate data servers 140 that contain the resource requested by client device 105. Request server 130 may determine a single appropriate data server 140 or request server 130 may determine a plurality of data servers that can serve the requested resource. In the latter case, request server 130 may specify a primary data server 140, a secondary data server 140 to which a connection should be established if primary data server 140 is unavailable, and so forth.

Request server 130 may determine the location of the requested resource in a variety of ways. Request server 130 may, for instance, query a resource location server disposed within distributed network 115. After identifying the appropriate data server 140, request server 130 may send a migrate socket request to the identified data server 140 by way of router 120. The migrate socket request may include socket state information and may be accompanied by information identifying the requested resource (e.g., the HTTP request). Upon receiving the migrate socket request, the identified data server 140 may establish a new socket with the migrated socket state information. Data server 140 may then transmit the requested resource (e.g., the video file requested by client device 105) over the newly established socket directly to router 120 and ultimately to client 105 without having to go back through request server 130 as an intermediary.

As part of, or in addition to, the migrate socket request, the plurality of routers 120 and 135 may be reprogrammed to recognize the newly available route made possible by the socket migrated from request server 130 to data server 140. Reprogramming the routers may include updating the routing tables stored in each database 125 of each router 120 or 135. Database 125 may be stored locally at each router or database 125 may be distributed across multiple routers 120 or 135 (or other network devices). Persons of ordinary skill in the art will appreciate that the term "routing table" may be used interchangeably with database 125 in many contexts. The routing tables may be updated with new connection information (e.g., new address and port information) to account for the fact that the migrated socket now resides with identified data server 140.

After socket migration has completed and the appropriate routers 120 and/or 135 have been reprogrammed such that their routing tables account for the new route made possible by the socket migration, data server 140 may receive packets originating from client 105 by way of a new, traffic-reduced route through distributed network 115. As shown in FIG. 1, an exemplary original pre-migration route is identified by short-dashed line A. Prior to migration, packets make numerous hops en route from client 105 to data server 140 (i.e., through network 110, to edge router 120, to request server 130, through a plurality of routers 135, and then finally to data server 140). Prior to migration, responsive data may follow a similar route back through distributed network 115, including passing through request server 130. In contrast, following migration of the socket from request server 130 to data server 140, data server 140 may communicate directly with edge router 120 as if data server 140 were request server 130. By reducing the number of transmission hops the packets must make to and from data server 140, the solution effectively reduces network load and frees up resources at request server 130.

Following migration and reprogramming of routers 120 and/or 135 as discussed above, data server 140 may send a response (e.g., an HTTP response) by way of other new routes through distributed network 115. As shown in FIG. 1, one exemplary new route is identified by long-dashed line B. Notably, long-dashed route B does not include a request server 130. In various embodiments, depending on the way distributed network 115 is configured, a given response may instead follow a different response route back to network 110 and ultimately to client 105. For instance, rather than following the route from router 120 to network 110 identified by long-dashed line B, a response may first flow through one or more of the adjacent edge routers 120 to the original edge router 120 as it is routed to network 110. Persons of ordinary skill in the art will readily recognize that the routes and network architecture described in this disclosure are merely exemplary and are in no way limiting. Such persons will readily appreciate that many other routes may be created and utilized depending on the network architecture at issue.

As the response data transmitted by data server 140 travels back to and ultimately reaches client device 105, client device 105 may send acknowledgements (e.g., an ACK) confirming its successful receipt of the data. In various embodiments of the present solution, the acknowledgements may follow one of several routes back to the identified data server 140 without having to first pass through request server 130 (i.e., the request server that originally relayed the client request). The acknowledgments may, for example, follow long-dashed route B back to identified data server 140. In other cases, depending on the configuration of distributed network 115, the acknowledgements may be routed along a different pathway (e.g., first along short-dashed route A, then over through the series of edge routers 120 until finally reaching identified data server 140).

Which route the acknowledgements may follow in a given embodiment may be determined by considerations such as address ranges, routing table information, whether certain routing routes are permitted under the Internet service provider of either distributed network 115 or client device 105, and other considerations. In any event, the solution permits data server 140 to receive acknowledgments while effectively cutting request server 130 out of the transmission pathway. In doing so, the solution limits the number of required transmission steps and reduces network load, particularly at request server 130. Rather than keep a process or thread open for the single client request sent by client device 105, requested server 130 is freed up to handle other incoming client requests and need not continue serving as a relay device for responsive data and acknowledgements between client device 105 and data server 140.

Figure 2:
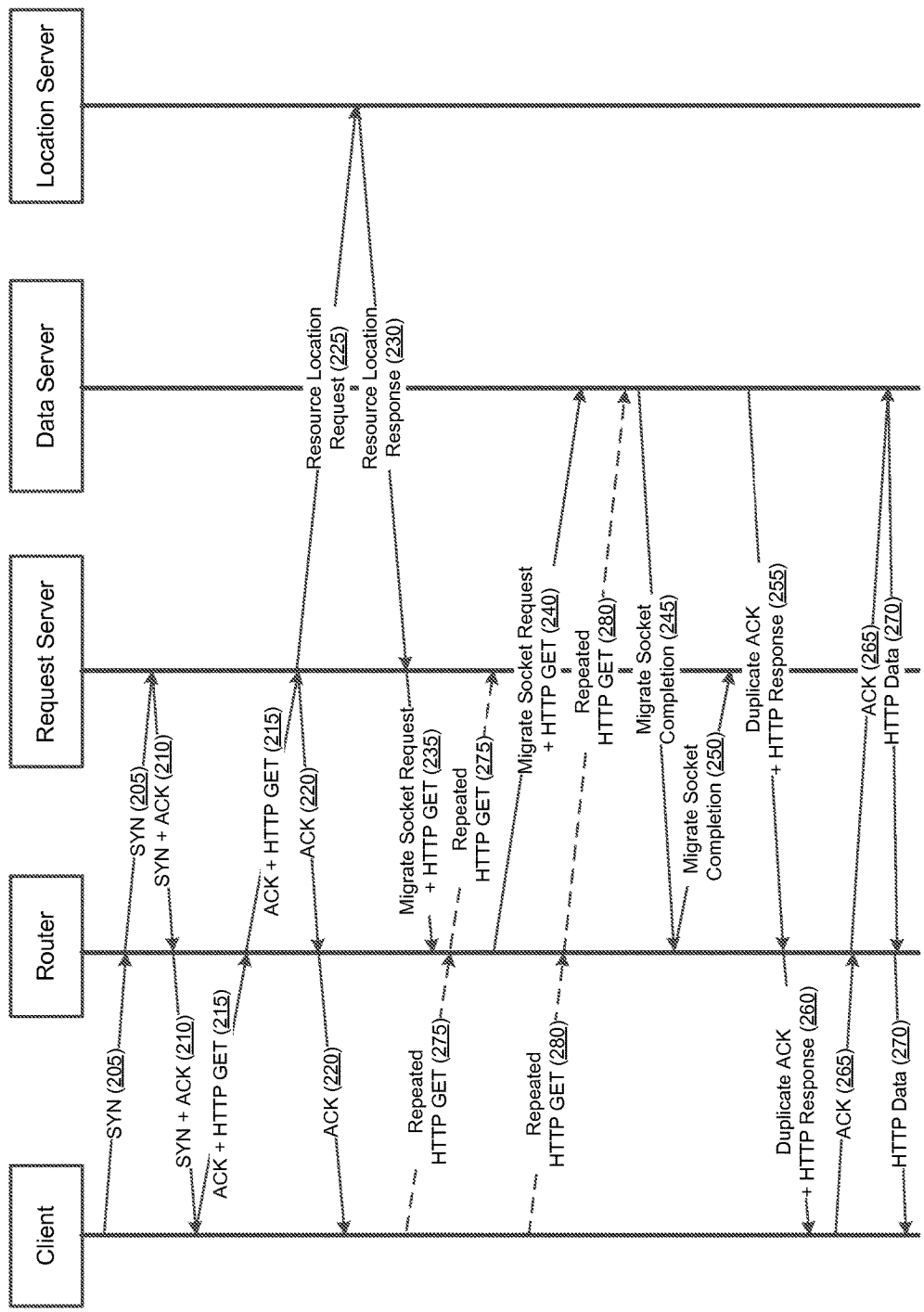
FIG. 2 is a flow diagram illustrating an exemplary method for reducing transmission pathway lengths in a distributed network.

FIG. 2 is a flow diagram illustrating an exemplary method 200 for reducing transmission pathway lengths in a distributed network. More particularly, FIG. 2 illustrates an exemplary flow of data between various network devices in an illustrative distributed network environment. Although FIG. 2 illustrates responsibilities executed by a client, a router (e.g., an edge router), a request server, a data server, and a resource location server, persons of ordinary skill in the art will readily recognize that the foregoing devices are merely exemplary and that other embodiments of the present solution may be applied within the context of other network devices depending on the network architecture at issue. In the exemplary flow shown in FIG. 2, level 3, level 4, and level 7 mixed protocol layer elements are illustrated. Data packets indicated by arrows originating or terminating at the router may be treated as layer 3 IP packets. Data packets indicated by arrows terminating at the client or resource server may be treated as either layer 4 or layer 7 TCP packets.

In one exemplary embodiment, method 200 may include establishing a TCP connection between a client device (e.g., client device 105 of FIG. 1) and a request server (e.g., request server 130 of FIG. 1). At step 205, the client device may transmit a synchronize packet (SYN) to an edge router disposed near the entrance of a distributed network (e.g., a large private distribute network), which may then relay the SYN to the request server. After receiving the SYN successfully, at step 210 the request server may send a synchronization acknowledgement packet (SYN+ACK) to the router, which may then relay the SYN+ACK back to the client. At step 215, the client may transmit an ACK back to the router, which may relay the ACK to the request server. After the request server has received the ACK from the client device, a TCP socket connection between the request server and the client may be established. At step 215, when the client transmits the ACK back to the router (and ultimately to the request server), the client may also transmit an HTTP request (e.g., HTTP GET) along with the ACK. At step 220, the request server may send the client, by way of the router, an ACK acknowledging successful receipt of the HTTP request.

At step 225, the request server may identify an appropriate data server having the requested resource (e.g., an image file, video file, or the like). The request server may identify the appropriate data server in variety of ways. In one exemplary manner, as shown at step 225, the request server may query a resource location server by sending a resource location request. At step 230, the resource location server may respond by sending a resource location response. The request server may receive the resource location response and examine it to identify the appropriate data server. The request server may determine the appropriate data server (or multiple data servers) in a variety of other ways.

At step 235, the request server may send a migrate socket request to the router. The migrate socket request may include socket state information necessary for the data server to inherit the socket from the request server. The migrate socket request may be accompanied by or may include instructions that, when executed by a processor of the router, reprogram the router to account for the socket migration. Reprogramming the router may include, among other things, updating the routing tables stored within the router such that, when client packets are subsequently received, the router does not send them to the requester server. Instead, the router may send the packets directly to the data server because the established TCP socket resides with the data server instead of the request server where it was located when initially established via the TCP handshake between the client and the request server. In distributed networks that include multiple routers, like the exemplary network environment shown in FIG. 1, the first router reprogrammed may be responsible for notifying all other appropriate routers along the new route so that the additional routers route subsequent data properly. A router may notify other routes of the newly established socket and the resulting new route by passing the migrate socket request along the newly established route.

In its routing table, the router may store information necessary for identifying an operable connection and for matching sources with destinations. The routing tables may include, for instance, source subnets and destination subnets, or it may include address and service port numbers associated with source and destination endpoints. The router may recognize a connection according to a tuple defined as SRC, DST, where SRC defines the source endpoint of a packet (i.e., the endpoint associated with the client) and DST defines the destination endpoint of the packet (i.e., the endpoint associated with the network device to which the client is ultimately attempting to send packets). In the TCP/IP 4 protocol, a typical endpoint is defined by an address and a port number. Thus, the router may identify a connection according to its source address (SRC-ADDRESS), source port (SRC-PORT), destination address (DST-ADDRESS), destination port (DST-PORT).

Updating the routing tables stored within the router when reprogramming the router to account for the newly established socket at the data server may include using the DST tuple or full tuple (i.e., SRC-ADDRESS, SRC-PORT, DST-ADDRESS, DST-PORT) as opposed to merely routing packets according to DST-ADDRESS. Doing so may allow network devices to differentiate between connections and avoid a scenario in which more than one network device is handling packets for a specific DST-ADDRESS.

Updating the routing tables may include matching packets of a migrated connection to an appropriate data server containing the requested resource. The packets may be matched according to the SRC-ADDRESS, SRC-PORT, DST-ADDRESS, and DST-PORT associated with the migrated connection. A specific router realm may be assigned to the packets, which may cause the MAC address of the data server to be used when directing the packets and may ultimately cause the packets to be routed to the specified data server. The solution may include using one or more openflow SDN entries. The SDN openflow entries may be made in forwarding tables so as to direct packets to the data server based on a matched SRC-ADDRESS, SRC-PORT, DST-ADDRESS, and DST-PORT associated with the migrated connection.

In addition to the foregoing, the routing table may store level 2 address information, which may include MAC address information associated with other network devices (and, in some cases, the Ethernet port at which the other network devices are connected). The router may store, for instance, the MAC address associated with the next downstream router along a given pathway.

In addition to referencing the source and destination information associated with the connection, each router may use the MAC address associated with the next downstream router to identify the proper router ultimately to which the data should be handed off in accordance with the optimized route made possible by the migrated socket. When the downstream data server ultimately receives the data, it can recognize and accept the delivery because it has established the socket state information inherited from the request server.

The router may also or alternatively store the natural IP address of the destination data server. In such cases, the router may be able to use existing routing tables given that the natural IP address of the data server is present. The router may recognize the first two bytes of a six-byte MAC address as a predetermined code or "magic number" that notify the router that the remaining four bytes are in fact the natural IP address of the data server. The router may recognize the predetermined code, read the IP address of the data server, and route the data according to existing routing rules in its routing table. The foregoing solution may be beneficial when applied in a network featuring complicated route balancing rules.

In one embodiment, the migrate socket request sent from the request server to the router may be a packet targeted towards the IP address of the data server identified as storing the resource requested by the client. The edge router may recognize that the packet is a migrate socket request and update its routing table based on the packet information. The router may update its routing table to reflect how the router would transmit packets directly to the data server. The router may then forward the migrate socket request to the next downstream router. Although the request may be addressed to the data server, each router may recognize that the packet is a migrate socket request. In response, each router may route the request as it normally would because the request is addressed to the data server. But because the request also contains the original source and destination of the socket being migration, the router may also update its routing table with the source and destination information. As a result, when new packets traverse the network path, the router may properly forward them.

In another embodiment, the packet may not be addressed to the data server, but may instead directly contain the IP address of the data server and associated port numbers (e.g., as payload of a specially formatted migration request that is address to the router). The packet may be any packet that the routers are configured to recognize. The particular type of packet used will depend on which type of packet is most easily recognizable and actionable for the particular type of router being used in the network environment at issue. As illustrated in the above discussion, a wide variety of triggers may be used to reprogram the routers by sending a packet containing the necessary information (e.g., the source and destination information, plus the identity of the appropriate data server) from the edge router to the new data server along a new route that passes through each router on the way (allowing each router to update its routing tables).

Although the foregoing description has, for illustrative purposes, discussed managing packet routes in the context of tracking individual connections, persons of ordinary skill in the art will recognize that the routers may manage packet routes by tracking source and destination subnets. How routers in any given embodiment may maintain the information necessary to add, track, manage, and delete routes will depend on the particular router used to apply the present solution. A wide variety of routers may be utilized and the present solution is not limited to any one particular type of router or other network device.

The migrate socket request transmitted from the request server to the router at step 235 may also be accompanied by the original HTTP request send by the client and received by the request server at step 215. At step 240, the router may send the migrate socket request, which includes information concerning the newly programmed router tables, to the data server. In addition to sending the migrate socket request, the router may also send either the original HTTP request or a modified or duplicate version of the original HTTP request. Passing the HTTP request to the data server permits the data server to know what to do with the newly established socket once it is established.

At step 245, after the socket is successfully established at the data server, the data server may transmit a migrate socket completion message to the router. The router, in turn, may send a migrate socket completion message to the request server. After receiving confirmation that the socket has been successfully established at (i.e., migrated to) the data server, the request server may close the process or thread that previously served the HTTP request (or otherwise terminate the relevant socket structures). As a result, future data packets may be routed from the client to the data server more efficiently (i.e., more directly, rather than using the request server as an intermediate). By closing the applicable process or thread, the request server may free up resources and make itself available to handle other requests. Thus, the solution uses an innovative socket migration technique to effectively reduce network transmission pathway lengths in multiple ways.

At step 255, after the socket has been successfully migrated to the data server and the new route is available, the data server may send a duplicate ACK (i.e., duplicate of the ACK sent from the request server to the client) to the router. The router may then relay the duplicate ACK to the client at step 260. The duplicate ACK may ensure that any repeat data sent by the client and lost in transmission during migration is speedily retransmitted and later acknowledged. Along with the duplicate ACK, the data server may deliver the requested data (i.e., the HTTP response) to the client by way of the router at steps 255 and 260. At step 265, the client may send an ACK to the router, which may, using the newly established route made possible by the migrated socket and the reprogrammed router tables, bypass the request server and transmit the ACK directly to the data server that served the response. As shown at step 270, the data server may then continue to transmit HTTP data the client by way of the router and without relying on the request server as an intermediary. Thus, by using the newly established route going forward, the load placed upon the distributed network is effectively reduced.

Under ordinary circumstances the client would not be expected to retransmit the HTTP request (rather, the client would wait for the response after having established the TCP connection and transmitted the original HTTP request). As shown at instances 275 and 280, however, in some scenarios the client may indeed retransmit the HTTP request as permitted by TCP when an acknowledgement is not received due to a delayed ACK (e.g., due to packet loss). The device receiving the repeat HTTP request (e.g., the request server in the case of instance 275 or the data server in the case of instance 280) may recognize the HTTP request as repeated data based on the TCP packet (e.g., sequence number). The client may do so, for instance, if the ACK identified in step 220 failed to successfully reach the client. In some cases, the client may transmit the repeat HTTP request during the in-between phase in which the TCP socket is being migrated from the request server to the data server (e.g., after the socket has begun migration, but before the routers are fully reprogrammed to account for the new route and the data server is ready to receive packets). In those circumstances, further data packets sent by the client may be dropped by the network due because the socket migration has not yet completed. In either case, when the client retransmits the HTTP request, the data server (after having established the new socket) may ignore the retransmitted HTTP request and reissue the ACK just as the original socket owner (i.e., the resource server) would have done if it received a repeat HTTP request.

As shown at instance 275, the client may transmit the repeat HTTP request to the request server when socket migration has begun but not yet completed. In that case, the request server may reroute the repeat HTTP request to the data server once migration is complete and the new socket is established. The client may also transmit the repeat HTTP request after the network routes have been updated at the routers, but before the migration has fully completed (as shown at instance 280). In that case, the incoming packet queue may hold the HTTP request until migration is complete. Alternatively, the repeat HTTP request may be dropped and later retransmitted by the client (assuming the client has not first received the duplicate ACK+HTTP response illustrated in steps 255 and 260, which would obviate the client's need to retransmit the request).

In some instances, rather than sending a repeat HTTP request, the client may send new (i.e., non-repeat) data. If the client sends the new data before the routers are properly reprogrammed to account for the new migration-based route, the data may be routed to the original request server (when the request server has already initiating migration of the socket) or the data server. When the request server received the new data, it may notify the router that migration has already begun and may request that the data be retransmitted along the new route once migration of the socket is complete and the router has been fully reprogrammed with the new route. Alternatively, it may drop the packet knowing that the packet will ultimately be retransmitted when the duplicate ACK is sent.

At step 280, if the alternate routes have been established but the data server has not yet received the migrate socket completion message transmitted at step 240 (e.g., after a predetermined period of time), the router may repeat the migrate socket request. If repeated attempts to send the migrate socket request to the identified data server fail, the router may attempt to send the migrate socket request to an alternative data server. In that regard, in some cases the resource location server may identify a primary data server storing the requested resource and additional data servers (e.g., a secondary or backup data server) to attempt in the event the primary data server repeatedly fails to receive the migrate socket request (e.g., in the event the primary data server has become unavailable). Alternatively, when the router defers establishment of the new routes until the migrate socket completion message is received, the router may direct packets to the request server. The request server may then repeat the migrate socket request, forward the packet to the data server, or simply drop the packet.

After the migrated socket has fulfilled its purpose and the router receives close or reset packets originating from the data server, each router may recognize that the migrated socket has been closed and that the router tables must be updated to reflect that the migration-based route is no longer available. The routers may alternatively update the router tables in response to receiving close or reset packets from the client (e.g., when the request is aborted), after observing that the migrated socket has been idle beyond a predetermined period of time (e.g., a timeout occurs), or any other event occurs that indicates the migrated has been closed. Updating the routing tables at that point may include deleting the routing information associated with the route that was made possible by virtue of migrating the established TCP socket from the request server to the data server.

As discussed above, in some embodiments of the solution, the migrated socket may be closed after its purpose is fulfilled (e.g., after the requested resource has been served to the client). In other embodiments, however, the migrated socket may instead be transferred back to the request server (e.g., where the client has negotiated a persistent connection with the request server). In such cases, rather than merely deleting the routing information associated with the migration-based route, the solution may also include passing the socket state information back to the request server so that it may continue to use the socket and serve the client.

Reprogramming the network may not include updating the routing tables at each router in the network or each router along a specified transmission pathway. In such cases, the router may include a facility for network address translation (NAT). When the edge router receives the migrate socket request, it may NAT the connection to obtain the destination address of the data server. In such cases, the data server may recognize its IP address and interpret the packet as a direct communication from the client. When the responses come back through the network as normal en route to the client, the edge router may change the source address for NAT purposes. In effect, the edge router may perform NAT halfway through the life of the connection to change the destination and/or source address as necessary. The foregoing embodiment of the solution may be particular useful in environments in which updating the routing tables of the routers is undesirable.

In still further embodiments, rather than performing NAT halfway through the life of the connection, the edge router may initiate a new TCP connection with the data server and the edge router may perform the translation between the two sockets (e.g., via buffer-copy). The edge router may, for instance, send a SYN, receive an ACK, establish a connection, repeat the HTTP request, and then forward between the client connection and the new connection it established. In such cases, the edge router may effectively act as a surrogate for the request server (i.e., creating a new socket and then relaying data). To optimize the solution, the edge router may, as an alternative to maintaining two sockets and relaying data, may bridge the sockets together using a NAT table and/or a NAT helper. The NAT table may include sequence numbers and tuple fixups. The foregoing solution, which in effect migrates the newly established socket to the edge router rather than the data server, may permit the solution to reduce transmission pathway lengths in scenarios in which the data server cannot receive a migrated socket.

Although the foregoing description discusses migrating sockets in the context of HTTP data (e.g., HTTP requests and HTTP responses), persons of ordinary skill in the art will readily recognize and appreciate that the use of HTTP data is merely illustrative and that the solution's applicability is in no way limited to such data. Such persons will recognize that the solution may be utilized with many other types of request-response protocols (e.g., an IMAP protocol or the like). The solution may also be implemented in the context of secure protocols (e.g., HTTPS socket states may be migrated as well). In such cases, an HTTPS concentrator may remove the encryption before the solution acts on the data.

Figure 3:
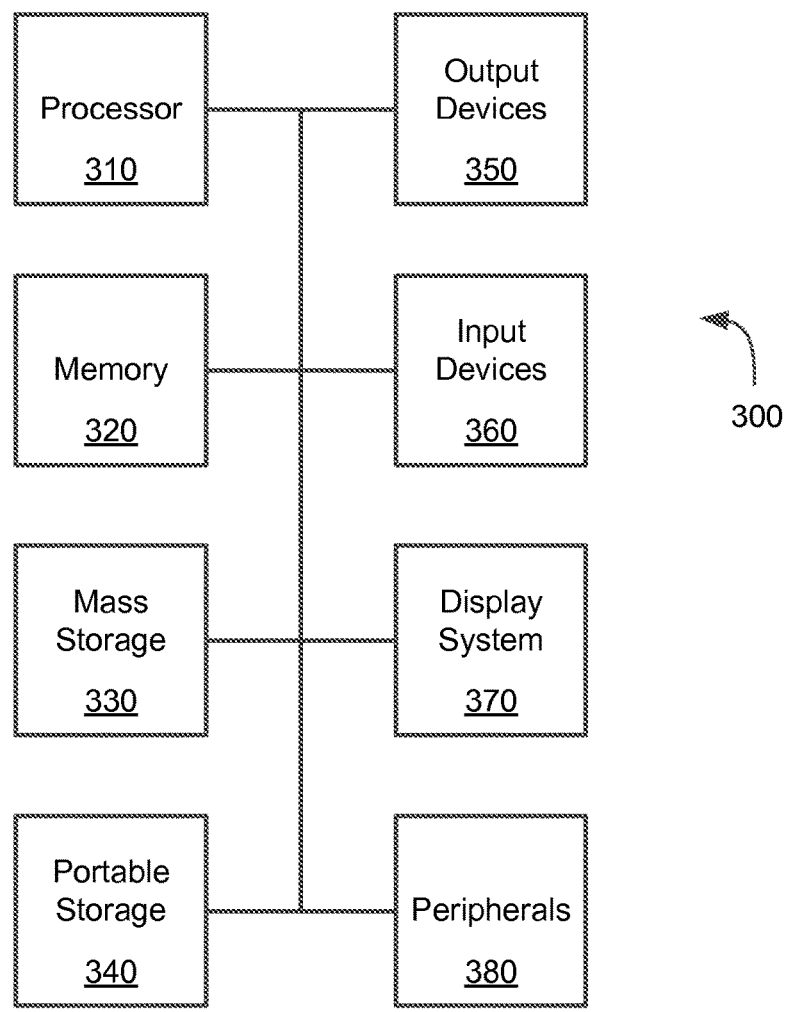
FIG. 3 is a block diagram of an exemplary system for implementing a computing device.

FIG. 3 is a block diagram of an exemplary system for implementing a computing device. The computing system 300 of FIG. 3 may be implemented in the context of client 105, communication network 110, router 120 or 135, request server 130, and data server 140 of FIG. 1. The computing system of FIG. 3 may include one or more processors 310 and memory 320. Main memory 320 may store, in part, instructions and data for execution by processor 310. Main memory 320 may store the executable code when in operation. Computing system 300 may further include a mass storage device 330, a portable storage medium drive 340, output devices 350, user input devices 360, a graphics display system 370, and peripheral devices 380.

The components shown in FIG. 3 are depicted as being connected via a single bus 390. The components may alternatively be connected through one or more data transport means. Processor 310 and main memory 320, for example, may be connected via a local microprocessor bus. Mass storage device 330, peripheral device(s) 380, portable storage device 340, and display system 370 may be connected via one or more input/output buses.

Mass storage device 330, which may be implemented with a magnetic disk drive or an optical disk drive, may be a non-volatile storage device for storing data and instructions for use by processor 310. Mass storage device 330 may store system software for implementing embodiments of the solution described herein for purposes of loading the software into main memory 320.

Portable storage device 340 may operate in conjunction with a portable non-volatile storage medium, such as a compact disk or digital video disc, to input and output data and code to and from computer system 300. The system software for implementing embodiments of the present solution may be stored on such a portable medium and input to computer system 300 via portable storage device 340.

Input devices 360 may provide a portion of a user interface. Input devices 360 may include an alpha-numeric keypad, such as a keyboard, touch screen, or touchpad, for inputting alpha-numeric and other information, or a pointing device, such as a mouse, a trackball, stylus, or cursor direction keys. Additionally, system 300 may include output devices 350, such as speakers, printers, network interfaces, monitors, and the like.

Display system 370 may include a liquid crystal display or other suitable display device. Display system 370 may receive textual and graphical information and may process the information for output to the display device.

Peripherals 380 may include any type of computer support device to add additional functionality to computer system 300. Peripheral device 380 could be, for example, a modem or a router.

The components illustrated in computer system 300 of FIG. 3 are those typically found in computer systems that may be suitable for use with embodiments of the present solution. The depiction of such components is not intended to be exhaustive in nature, but is rather intended to represent a broad category of computer components that are well known in the art. Thus, system 300 may be a desktop computer, workstation, server, mainframe computer, laptop, tablet, smartphone or other mobile or hand-held computing device, or any other suitable computing device. Computer system 300 may also include various bus configurations, networked platforms, multi-processor platforms, and the like. Various operating systems may be used, such as Unix, Linux, Windows, Macintosh OS, Palm OS, and other suitable operating systems.

The solution described herein constitutes a novel, substantial, and meaningful improvement to the technical processes of routing packets within a distributed network. By migrating an established socket from a request server to a data server storing a resource requested by a client and reprogramming the network routing tables, the solution effectively reduces network transmission pathway lengths and frees up resources at request servers.

The foregoing detailed description has been presented for purposes of illustration and description. It is not intended to be exhaustive or to limit the technology to the precise form disclosed (e.g., only to HTTP protocols or only to the precise network architecture described for illustrative purposes). Many modifications and variations are possible in light of the above teaching. The described embodiments were chosen in order to best explain the principles of the technology and its practical application to enable others skilled in the art to best utilize the technology in various embodiments and with various modifications as suited to the particular use contemplated. It is intended that the scope of the technology be defined by the claims appended hereto.

What is claimed is:

1. A system for reducing transmission pathway lengths within a distributed network, the system including:

a request server communicatively coupled to the network, wherein the request server:

establishes a socket, the socket associated with socket state information, receives a client request from a client device communicatively coupled to the network, queries a resource location server regarding which of a plurality of data servers capable of fulfilling the client request, and identifies a data server capable of fulfilling the client request based on a resource location server response to the query, the data server being one of the plurality of data servers communicatively coupled to the network; and a router that receives a migrate socket request and the client request from the request server, wherein the router:

stores a routing table in memory, sends the migrate socket request and the client request to the data server identified by the request server as being capable of fulfilling the client request, wherein the identified data server establishes a new socket based on socket state information in the migrate socket request, and receives a data response from the identified data server over the established socket, wherein the response bypasses the request server.

2. The system of claim 1, wherein the migrate socket request includes an instruction that the router update the routing table to identify a new route based on the migrate socket request and the identified data server.

3. The system of claim 1, wherein the router updates the routing table by matching destination address and service port information with source address and service port information.

4. The system of claim 1, wherein the data server further determines that the client device received the data response.

5. The system of claim 4, wherein the data server closes the socket when the data server determines that the client device received the data response.

6. The system of claim 5, wherein the router recognizes the closed socket and updates the routing table to reflect that the socket is no longer available for routing purposes.

7. The system of claim 4, wherein the data server transfers the socket state information back to the request server when the data server determines that the client device received the data response.

8. The system of claim 1, wherein the request server identifies the data server capable of fulfilling the client request by identifying a primary server capable of fulfilling the client request, and wherein the request server further identifies a secondary server capable of fulfilling the client request when the primary server is unavailable.

9. The system of claim 1, wherein the router forwards the migrate socket request to one or more additional routers communicatively coupled by the network, and wherein each one or more additional routers includes a routing table that is updated upon receiving the migrate socket request.

10. The system of claim 1, wherein the client request is an HTTP request.

11. The system of claim 1, wherein the client request is an HTTPS request.

12. The system of claim 1, wherein the client request is a non-HTTP request.

13. A method for reducing transmission pathway lengths within a distributed network, the method including:

establishing a socket associated with socket state information;

receiving at a router a client request, the client request received from a client device communicatively coupled to the router by the network;

sending the client request to a request server communicatively coupled to the router by the network;

querying a resource location server to identify which of a plurality of data servers communicatively coupled to the network is capable of fulfilling the client request;

identifying a data server capable of fulfilling the client request based on a resource location server response to the query, the data server being one of a plurality of data servers communicatively coupled to the network;

receiving from the request server a migrate socket request, the client request, and an identification of a data server storing a resource requested by the client request;

sending the client request and the migrate socket request to the identified data server, wherein the identified data server establishes a new socket based on socket state information in the migrate socket request;

executing instructions stored in memory of the router, wherein execution of the instructions by a processor of the router updates one or more routing tables to identify a new route between the client device and the identified data server based on the socket migration; and transmitting subsequent packets received from the client device to the data server over the new route, wherein the new route bypasses the request server.

14. The method of claim 13, wherein updating the one or more routing tables includes matching destination address and service port information with source address and service port information.

15. The method of claim 13, further comprising receiving an indication that the identified data server has closed the migrated socket.

16. The method of claim 15, further comprising updating the routing table to reflect that the socket is no longer available for routing purposes.

17. A non-transitory computer-readable storage medium having a program embodied thereon, the program being executable by a processor to perform a method for reducing transmission pathway lengths within a distributed network, the method including:

establishing a socket associated with socket state information;

receiving a client request, the client request received from a client device communicatively coupled to the router by the network;

sending the client request to a request server communicatively coupled to the router by the network;

querying a resource location server, the server used to identify data servers capable of fulfilling the client request;

identifying a data server capable of fulfilling the client request based on a resource location server response to the query, the data server being one of a plurality of data servers communicatively coupled to the network;

receiving from the request server a migrate socket request, the client request, and an identification of a data server storing the resource requested by the client request;

sending the client request and the migrate socket request to the data server, wherein the identified data servers establishes a new socket based on socket state information in the migrate socket request;

updating one or more routing tables to identify a new route between the client device and the identified data server based on the socket migration; and transmitting subsequent packets received from the client device to the identified data server over the new route, wherein the new route bypasses the request server.

18. The non-transitory computer-readable storage medium of claim 17, further comprising executable instructions for updating the one or more routing tables, wherein updating the one or more routing tables includes matching destination address and service port information with source address and service port information.

19. The non-transitory computer-readable storage medium of claim 17, further comprising executable instructions for receiving an indication that the identified data server has closed the migrated socket.

20. The non-transitory computer-readable storage medium of claim 18, further comprising executable instructions for updating the routing table to reflect that the socket is no longer available for routing purposes.

* * * * *